United States Patent
Shi et al.

(10) Patent No.: US 11,164,004 B2
(45) Date of Patent: Nov. 2, 2021

(54) KEYFRAME SCHEDULING METHOD AND APPARATUS, ELECTRONIC DEVICE, PROGRAM AND MEDIUM

(71) Applicant: BEIJING SENSETIME TECHNOLOGY DEVELOPMENT CO., LTD., Beijing (CN)

(72) Inventors: Jianping Shi, Beijing (CN); Yule Li, Beijing (CN); Dahua Lin, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/633,341

(22) PCT Filed: Dec. 25, 2018

(86) PCT No.: PCT/CN2018/123445
§ 371 (c)(1),
(2) Date: Jan. 23, 2020

(87) PCT Pub. No.: WO2019/128979
PCT Pub. Date: Jul. 4, 2019

(65) Prior Publication Data
US 2020/0394414 A1 Dec. 17, 2020

(30) Foreign Application Priority Data
Dec. 27, 2017 (CN) .......................... 201711455838.X (51) Int. Cl.
*G06K 9/62* (2006.01)
*G06K 9/72* (2006.01)
(Continued)

(52) U.S. Cl.
CPC ..... *G06K 9/00744* (2013.01); *G06K 9/00765* (2013.01); *G06K 9/6217* (2013.01); *G06K 9/726* (2013.01); *G06N 3/04* (2013.01)

(58) Field of Classification Search
None
See application file for complete search history.

(56) References Cited

U.S. PATENT DOCUMENTS 9,530,047 B1 * 12/2016 Tang .................. G06K 9/4652
10,387,773 B2 * 8/2019 Yan .......................... G06N 3/04
(Continued)

FOREIGN PATENT DOCUMENTS

CN 102799684 A 11/2012
CN 105095862 A 11/2015
(Continued)

OTHER PUBLICATIONS

X Zhang et al., Data-driven autocompletion for keyframe animation, Publication: MIG'18: Proceedings of the 11th Annual Intl Conf on Motion, Interaction, and Games, Nov. 2018 Article No. 10 pp. 1-11. Online Aug. 23, 2018 https://open.library.ubc.ca/clRcle/collections/ubctheses/24/items/1.0371204 (Year: 2018).*

(Continued)

*Primary Examiner* — Tahmina N Ansari
(74) *Attorney, Agent, or Firm* — Syncoda LLC; Feng Ma (57) ABSTRACT

A key frame scheduling method and apparatus include: performing feature extraction on a current frame through a first network layer of a neural network to obtain low-layer features of the current frame acquiring a scheduling probability of the current frame according to low-level features of a previous key frame adjacent to the current frame and the low-level features of the current frame; determining whether the current frame is scheduled as a key frame according to the scheduling probability value of the current frame; and (Continued)

when determining that the current frame is scheduled as a key frame, performing feature extraction on low-level features of a current key frame via a second network layer of the neural network to obtain high-level features of the current key frame, where the network depth of the first network layer is less than the network depth of the second network layer.

16 Claims, 5 Drawing Sheets

(51) Int. Cl.
    *G06K 9/00*         (2006.01)
    *G06N 3/04*         (2006.01)

(56) References Cited

U.S. PATENT DOCUMENTS

| | | | |
|---|---|---|---|
| 2016/0358628 A1* | 12/2016 | Liu | G06K 9/00765 |
| 2016/0378863 A1 | 12/2016 | Shlens et al. | |
| 2017/0011264 A1* | 1/2017 | Smolic | G11B 27/28 |
| 2017/0091558 A1 | 3/2017 | Smolic et al. | |
| 2018/0025079 A1* | 1/2018 | Xiao | G06F 16/739 707/722 |
| 2019/0122035 A1* | 4/2019 | Wang | G06K 9/469 |
| 2019/0314984 A1* | 10/2019 | Gonzalez Aguirre | B25J 9/1664 |
| 2020/0394414 A1* | 12/2020 | Shi | G06K 9/00744 |

FOREIGN PATENT DOCUMENTS

| | | |
|---|---|---|
| CN | 105677735 A | 6/2016 |
| CN | 107484017 A | 12/2017 |
| CN | 108229363 A | 6/2018 |
| JP | 2003134450 A | 5/2003 |
| JP | 2005346472 A | 12/2005 |
| JP | 2017538195 A | 12/2017 |

OTHER PUBLICATIONS

Ma W-Y et al.: "An Indexing and Browsing System for Home Video", Signal Processing Theories and Applications, Proceedings Ofeusipco, XX, XX, vol. 1,Sep. 4, 2000 (Sep. 4, 2000), pp. 131-134, XP001055537, Section 2; figure 1.

Marichal X et al: "Blur determination in the compressed domain using DCT information", Image Processing. 1999. ICIP 99. Proceedings. 1999 International Conference On-Kobe, Japan Oct. 24-28, 1999, IEEE, Piscataway, NJ, USA, vol. 2, Oct. 24, 1999 (Oct. 24, 1999), pp. 386-390. XP010369119, DOI: 10 1109/ICIP.1999. 822923 ISBN: 978-0-7803-5467-8, Section 2.3; figure 3.

Supplementary European Search Report in the European application No. 18897706.0, dated Sep. 25, 2020.

Wang Helong, Airborne Electro-Optical System and Control Technique. Image Mosaic technique, p. 255. Aviation Industry Press, Jun. 30, 2016 (Jun. 30, 2016).

Notice of Rejection of the Chinese application No. 201711455838. X, dated Oct. 29, 2020.

Cao, Changqing, "Research on Key Frame Extraction in Content-Based Video Retrieval", Wanfang Data, issued an Dec. 30, 2013, p. 22.

Dai Dongfeng, "Research on Video Multi-Semantic Annotation Based on Hypergraph Model", Wanfang Data, issued on Sep. 2, 2012, p. 7-12, Figure 2.1.

Sun Jifeng, "Adaptive Time Algorithm of Key-frame Extraction in Video Database Retrieval and Browsing", vol. 29 No. 7, Computer Engineering, issued on Sep. 4, 2003, p. 150-151.

International Search Report in the international application No. PCT/CN2018/123445, dated Mar. 25, 2019.

English translation of the Written Opinion of the International Search Authority in the international application No. PCT/CN2018/ 123445, dated Mar. 25, 2019.

First Office Action of the Chinese application No. 201711455838.X, dated Nov. 20, 2019.

Second Office Action of the Chinese application No. 201711455838. X, dated May 20, 2020.

Yule Li, et al. "Low-Latency Video Semantic Segmentation", published on Apr. 2, 2018.

Alex Krizhevsky, an outside binary name, "ImageNet Classification with Deep Convolutional Neural Networks", and Nips'12: Proceedings of the 25th International Conference on Neural Information Processing Systems, the U.S., The Neural Information Processing Systems Foundation,2012 (12), pp. 1097-1105.

Koichi Ito, an outside binary name, the "A Liveness Detection Method Using Convolutional Neural Network", IEICE Transactions on Information and Systems A, Japan, Institute of Electronics, Information and Communication Engineers, Dec. 1, 2017, and J100-A vol. No. 12, pp. 455-464.

First Office Action of the Japanese application No. 2020-519444, dated May 31, 2021.

* cited by examiner

KEYFRAME SCHEDULING METHOD AND APPARATUS, ELECTRONIC DEVICE, PROGRAM AND MEDIUM

CROSS-REFERENCE TO RELATED APPLICATIONS

The present application is a national stage of International Application No. PCT/CN2018/123445 filed on Dec. 25, 2018, which claims priority to Chinese Patent Application No. CN201711455838.X, filed on Dec. 27, 2017. The disclosures of these applications are hereby incorporated by reference in their entirety.

TECHNICAL FIELD

The present disclosure relates to computer vision technologies, and in particular, to a key frame scheduling method and apparatus, an electronic device, a program, and a medium.

BACKGROUND

Video semantic segmentation is an important issue in a task of computer vision and video semantic understanding. A video semantic segmentation model has an important application in many fields, such as automatic driving, video monitoring, and video target analysis. The video semantic segmentation speed is an important aspect of a video semantic segmentation task.

SUMMARY

Embodiments of the present disclosure provide technical solutions for key frame scheduling.

A key frame scheduling method provided according to one aspect of the embodiments of the present disclosure includes:

performing feature extraction on a current frame via a first network layer of a neural network to obtain a low-level feature of the current frame;

obtaining a scheduling probability of the current frame according to a low-level feature of a previous key frame adjacent to the current frame and the low-level feature of the current frame, where the low-level feature of the previous key frame is obtained by performing feature extraction on the previous key frame via the first network layer, and the scheduling probability is a probability that the current frame is scheduled as a key frame;

determining whether the current frame is scheduled as a key frame according to the scheduling probability of the current frame; and if determining that the current frame is scheduled as a key frame, determining the current frame to be a current key frame, and performing feature extraction on a low-level feature of the current key frame via a second network layer of the neural network to obtain a high-level feature of the current key frame, where the network depth of the first network layer in the neural network is less than the network depth of the second network layer in the neural network.

In any one of the foregoing method embodiments of the present disclosure, the method further includes:

determining an initial key frame;

performing feature extraction on the initial key frame via the first network layer to obtain a low-level feature of the initial key frame and buffer the same; and performing feature extraction on the low-level feature of the initial key frame via the second network layer to obtain a high-level feature of the initial key frame.

In any one of the foregoing method embodiments of the present disclosure, the method further includes:

performing semantic segmentation on the initial key frame to output a semantic label of the initial key frame.

In any one of the foregoing method embodiments of the present disclosure, after determining that the current frame is scheduled as a key frame, the method further includes:

buffering the low-level feature of the current key frame.

In any one of the foregoing method embodiments of the present disclosure, the obtaining a scheduling probability of the current frame according to a low-level feature of a previous key frame adjacent to the current frame and the low-level feature of the current frame includes: splicing the low-level feature of the previous key frame and the low-level feature of the current frame to obtain a spliced feature; and obtaining, via a key frame scheduling network, a scheduling probability of the current frame on the basis of the spliced feature.

In any one of the foregoing method embodiments of the present disclosure, the method further includes:

performing semantic segmentation on the current key frame to output a semantic label of the key frame.

A key frame scheduling apparatus provided according to another aspect of the embodiments of the present disclosure includes:

a first feature extracting unit, including a first network layer of a neural network, configured to perform feature extraction on a current frame to obtain a low-level feature of the current frame;

a scheduling unit, configured to obtain a scheduling probability of the current frame according to a low-level feature of a previous key frame adjacent to the current frame and the low-level feature of the current frame, where the low-level feature of the previous key frame is obtained by performing feature extraction on the previous key frame via the first network layer, and the scheduling probability is a probability that the current frame is scheduled as a key frame;

a determining unit, configured to determine whether the current frame is scheduled as a key frame according to the scheduling probability of the current frame; and a second feature extracting unit, including a second network layer of the neural network, configured to, according to a determining result of the determining unit, if determining that the current frame is scheduled as a key frame, determine the current frame to be a current key frame, and perform feature extraction on a low-level feature of the current key frame to obtain a high-level feature of the current key frame, where the network depth of the first network layer in the neural network is less than the network depth of the second network layer in the neural network.

In any one of the foregoing apparatus embodiments of the present disclosure, the previous key frame includes a predetermined initial key frame; and the apparatus further includes:

a buffering unit, configured to buffer a low-level feature and a high-level feature of a key frame, the key frame includes the initial key frame.

In any one of the foregoing apparatus embodiments of the present disclosure, the first feature extracting unit is further configured to buffer the low-level feature of the current key frame in the buffering unit according to the determining result of the determining unit.

In any one of the foregoing apparatus embodiments of the present disclosure, the scheduling unit includes:

a splicing subunit, configured to splice the low-level feature of the previous key frame and the low-level feature of the current frame to obtain a spliced feature;

a key frame scheduling network, configured to obtain a scheduling probability of the current frame on the basis of the spliced feature.

In any one of the foregoing apparatus embodiments of the present disclosure, the apparatus further includes:

a semantic segmenting unit, configured to perform semantic segmentation on the key frame to output a semantic label of the key frame, the key frame including: the initial key frame, the previous key frame, or the current key frame.

An electronic device provided according to still another aspect of the embodiments of the present disclosure includes: the key frame scheduling apparatus according to any one of the embodiments of the present disclosure.

An electronic device provided according to yet another aspect of the embodiments of the present disclosure includes: a processor and the key frame scheduling apparatus according to any one of the embodiments of the present disclosure, where when the processor runs the key frame scheduling apparatus, units of the key frame scheduling apparatus according to any one of the embodiments of the present disclosure are run.

An electronic device provided according to yet another aspect of the embodiments of the present disclosure includes a processor and a memory, where the memory is configured to store at least one executable instruction, and the executable instruction causes the processor to execute operations of steps in the key frame scheduling method according to any one of the embodiments of the present disclosure.

A computer program provided according to yet another aspect of the embodiments of the present disclosure includes a computer readable code, where when the computer readable code runs in a device, a processor in the device executes instructions for implementing steps of the vehicle driving simulation method according to any one of the embodiments of the present disclosure.

A computer readable medium provided according to yet another aspect of the embodiments of the present disclosure is configured to store computer readable instructions, where when the instructions are executed, operations of steps in the key frame scheduling method according to any one of the embodiments of the present disclosure are implemented.

On the basis of the key frame scheduling method and apparatus, the electronic device, the program, and the medium provided by the foregoing embodiments of the present disclosure, feature extraction is performed on a current frame to obtain a low-level feature of the current frame; a scheduling probability of the current frame is obtained according to a low-level feature of an adjacent previous key frame and the low-level feature of the current frame; whether the current frame is scheduled as a key frame is determined according to the scheduling probability of the current frame; and if it is determined that the current frame is scheduled as a key frame, feature extraction is performed on a low-level feature of a current key frame to obtain a high-level feature of the current key frame. According to the embodiments of the present disclosure, a change of the low-level feature of the current frame with respect to the previous key frame can be obtained according to the low-level feature of the previous key frame and the low-level feature of the current frame, key frame scheduling can be performed rapidly, accurately, and adaptively by use of a change of low-level features between different frames in a video, and the scheduling efficiency of a key frame is improved.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods, and devices known to a person of ordinary skill in the related art may not be discussed in detail, but such technologies, methods, and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer systems/servers may be described in the general context of computer system executable instructions (for example, program modules) executed by the computer system. Generally, the program modules may include routines, programs, target programs, assemblies, logics, data structures, and the like, to perform specific tasks or implement specific abstract data types. The computer systems/servers may be practiced in the distributed cloud computing environments in which tasks are executed by remote processing devices that are linked through a communications network. In the distributed computing environments, the program modules may be located in local or remote computing system storage media including storage devices.

Figure 1:
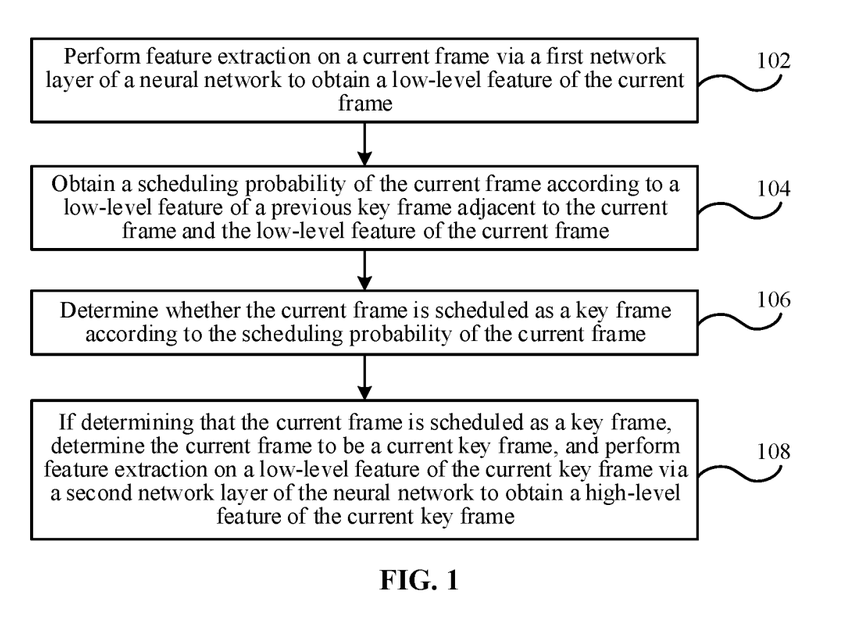
FIG. 1 is a schematic flowchart of a key frame scheduling method provided by the embodiments of the present disclosure.

FIG. 1 is a schematic flowchart of a key frame scheduling method provided by the embodiments of the present disclosure. As shown in FIG. 1, the method of the embodiments includes the following operations.

At 102, feature extraction is performed on a current frame via a first network layer of a neural network to obtain a low-level feature of the current frame.

According to one or more embodiments of the present disclosure, the current frame may be any image frame in a video.

In one optional example, step 102 may be executed by a processor by invoking a corresponding instruction stored in a memory, or may be executed by a first feature extracting unit run by the processor.

At 104, a scheduling probability of the current frame is obtained according to a low-level feature of a previous key frame adjacent to the current frame and the low-level feature of the current frame, where the low-level feature of the previous key frame is obtained by performing feature extraction on the previous key frame via the first network layer, and the scheduling probability provided by the embodiments of the present disclosure is a probability that the current frame is scheduled as a key frame.

In one optional example, step 104 may be executed by a processor by invoking a corresponding instruction stored in a memory, or may be executed by a scheduling unit run by the processor.

At 106, whether the current frame is scheduled as a key frame is determined according to the scheduling probability of the current frame.

In one optional example of the embodiments of the present invention, whether the current frame is scheduled as a key frame may be determined according to whether the scheduling probability of the current frame is greater than a preset threshold. For example, the preset threshold is 80%. If the scheduling probability of the current frame is greater than or equal to the preset threshold, it is determined that the current frame is scheduled as a key frame, i.e., it is considered that the current frame is a key frame; and if the scheduling probability of the current frame is less than the preset threshold, it is determined that the current frame is not scheduled as a key frame.

In one optional example, step 106 may be executed by a processor by invoking a corresponding instruction stored in a memory, or may be executed by a determining unit run by the processor.

At 108, if it is determined that the current frame is scheduled as a key frame, the current frame is determined to be a current key frame, and feature extraction is performed on a low-level feature of the current key frame via a second network layer of the neural network to obtain a high-level feature of the current key frame, where the network depth of the first network layer in the neural network is less than the network depth of the second network layer in the neural network.

In one optional example, step 108 may be executed by a processor by invoking a corresponding instruction stored in a memory, or may be executed by a second feature extracting unit run by the processor.

In the embodiments of the present disclosure, the neural network includes two or more network layers with different network depths; in the network layers included by the neural network, the network layer used for feature extraction may be called feature layers; after receiving a frame by the neural network, feature extraction is performed on the input frame via a first feature layer and the extracted feature is input to a second feature layer; starting from the second feature layer, feature extraction is performed on the input feature by each network layer in sequence, and the extracted feature is input to a next network layer for feature extraction, till a feature that can be used for semantic segmentation is obtained. The network depth of at least one feature layer in the neural network is shallow to deep according to the order of feature extraction, and according to the network depth, the feature layers used for feature extraction in the neural network may be divided into two parts: a low-level feature layer and a high-level feature layer, i.e., the first network layer and the second network layer, where feature extraction is performed sequentially by at least one feature layer among the low-level feature layers and the finally output feature is called a low-level feature, and feature extraction is performed sequentially by at least one feature layer among the high-level feature layers and the finally output feature is called a high-level feature. With respect to a feature layer with a shallow network depth in the same neural network, a feature layer with a deep network depth has a larger field of view, and more attention is paid to spatial structure information. When the extracted feature is used for semantic segmentation, the semantic segmentation is more accurate. However, the deeper the network depth is, the higher the difficulty and complexity of calculation are. In practical application, the feature layers in the neural network may be divided into a low-level feature layer and a high-level feature layer according to a preset standard, e.g. a calculation amount, and the preset standard may be adjusted according to actual needs. For example, for a neural network including 100 sequentially connected feature layers, the first 30, i.e., the $1^{st}$ to the $30^{th}$ (which may be other numbers) feature layers of the 100 feature layers are used as low-level feature layers according to a presetting, and the last 70, i.e., the $31^{st}$ to $100^{th}$, feature layers are used as high-level feature layers. For example, for a Pyramid Scene Parsing Network (PSPN), the neural network may include four parts of convolutional networks (conv1 to conv4) and a classification layer, and each part of convolutional network also includes a plurality of convolutional layers. According to the calculation amount, the convolutional layers from conv1 to conv4_3 in the PSPN are used as low-level feature layers, which account for about ⅛ of the calculation amount of the PSPN, and at least one convolutional layer of before from conv4_4 to the classification layer in the PSPN are used as a high-level feature layer, which accounts for about ⅞ of the calculation amount of the PSPN; and the classification layer is used for performing semantic segmentation on high-level features output by the high-level feature layer to obtain a semantic label of a frame, i.e., the classification of at least one pixel in the frame.

Since the extraction of the high-level features needs a second network layer with a deep network depth, the difficulty and complexity of calculation are high, and to obtain the semantic label of the frame accurately, semantic segmentation needs to be performed on the basis of the high-level features of the frame. Therefore, in the embodiments of the present disclosure, only high-level feature extraction is performed on a key frame for semantic segmentation, which, with respect to the manner that high-level feature extraction is performed on a video frame by frame, not only helps reduce the difficulty and complexity of calculation, but also may obtain a semantic segmentation result of the video.

On the basis of the key frame scheduling method provided by the embodiments of the present disclosure, feature extraction is performed on a current frame to obtain a low-level feature of the current frame; a scheduling probability of the current frame is obtained according to a low-level feature of an adjacent previous key frame and the low-level feature of the current frame; whether the current frame is scheduled as a key frame is determined according to the scheduling probability of the current frame; and if it is determined that the current frame is scheduled as a key frame, feature extraction is performed on a low-level feature of a current key frame to obtain a high-level feature of the current key frame. According to the embodiments of the present disclosure, a change of the low-level feature of the current frame with respect to the previous key frame can be obtained according to the low-level feature of the previous key frame and the low-level feature of the current frame, key frame scheduling can be performed rapidly, accurately, and adaptively by use of a change of low-level features between different frames in a video, and the scheduling efficiency of a key frame is improved.

In addition, in another embodiment of the key frame scheduling method of the present disclosure, before the embodiment shown in FIG. 1, the method may further include:

determining an initial key frame, for example, specifying a first frame or any other frame in a video as the initial key frame;

performing feature extraction on the initial key frame via the first network layer to obtain a low-level feature of the initial key frame and buffer the same, where subsequently, whether other frames are scheduled as key frames is determined on the basis of the low-level feature of the key frame (which may be determined by referring to step 102 above); and performing feature extraction on the low-level feature of the initial key frame via the second network layer to obtain a high-level feature of the initial key frame for semantic segmentation.

According to one or more embodiments of the present disclosure, in still another embodiment of the key frame scheduling method of the present disclosure, the method may further include: performing semantic segmentation on the initial key frame to output a semantic label of the key frame.

In addition, in still another embodiment of the key frame scheduling method provided by the embodiments of the present disclosure, after determining that the current frame is scheduled as a key frame, the method may further include: the current frame is called a current key frame, and a low-level feature of the current key frame is buffered so as to determine whether other frames after the current key frame in the video are scheduled key frames for use.

In addition, in yet another embodiment of the key frame scheduling method provided by the embodiments of the present disclosure, after determining that the current frame is scheduled as a key frame, the method may further include: the current frame is called a current key frame, and semantic segmentation is performed on the current key frame to output a semantic label of the current key frame. In the embodiments of the present disclosure, for a key frame, a single frame model having a high computational expense, for example, PSPN, may be invoked for semantic segmentation, thereby obtaining a high precision semantic segmentation result. In the embodiments of the present disclosure, the key frame and the current frame may share the low-level feature layer (i.e., the first network layer) of the neural network to perform low-level feature extraction, the neural network here may use a Pyramid Scene Parsing Network (PSPN), and the neural network may include four parts of convolutional networks (conv1 to conv4) and a classification layer, and each part of convolutional network is divided into a plurality of convolutional layers, where the low-level feature layer of the neural network may include the convolutional layers from conv1 to conv4_3 in the PSPN, which account for about ⅛ of the calculation amount of the PSPN; the high-level feature layer (i.e., the second network layer) of the neural network may include at least one convolutional layer of before from conv4_4 to the classification layer in the PSPN, which accounts for about ⅞ of the calculation amount of the PSPN and is used for extracting a high-level feature of the key frame; and the classification layer is used for correspondingly identifying the category of at least one pixel in the key frame on the basis of the high-level feature of the key frame, thereby implementing semantic segmentation of the key frame.

Figure 2:
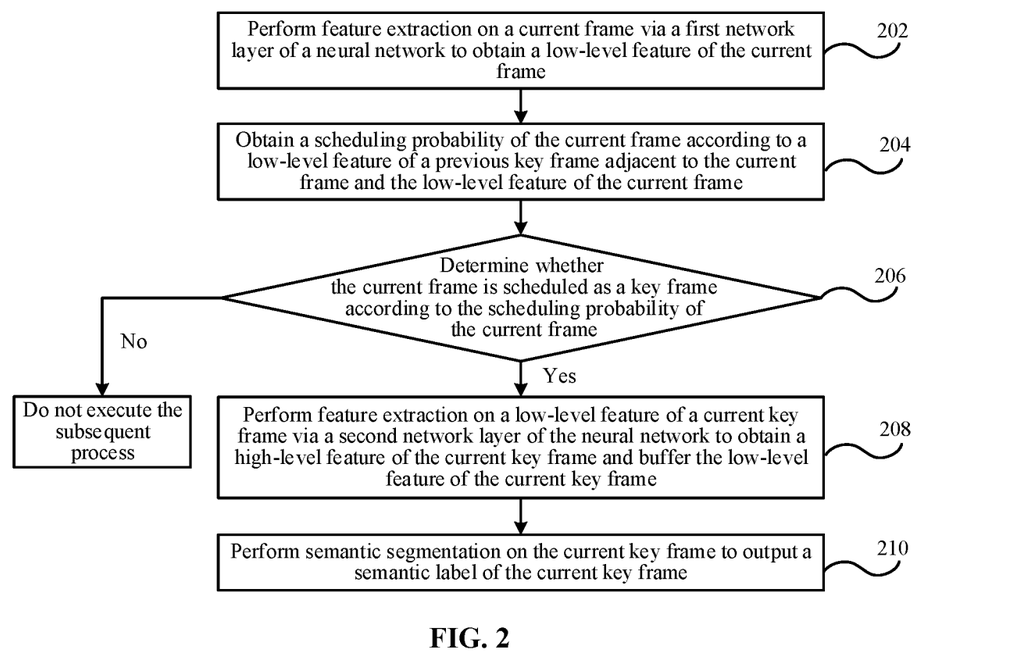
FIG. 2 is another schematic flowchart of a key frame scheduling method provided by the embodiments of the present disclosure.

FIG. 2 is another schematic flowchart of a key frame scheduling method provided by the embodiments of the present disclosure. As shown in FIG. 2, the key frame scheduling method according to this embodiment includes the following operations.

At 202, feature extraction is performed on a current frame via a first network layer of a neural network to obtain a low-level feature of the current frame.

In an example of the embodiments of the present disclosure, feature extraction may be performed on a current frame via a first network layer of a neural network to obtain a low-level feature of the current frame.

In an optional example, step 202 may be executed by a processor by invoking a corresponding instruction stored in a memory, or may be executed by a first feature extracting unit run by the processor.

At 204, a scheduling probability of the current frame is obtained according to a low-level feature of a previous key frame adjacent to the current frame and the low-level feature of the current frame, where the low-level feature of the previous key frame is obtained by performing feature extraction on the previous key frame via the first network layer, and According to one or more embodiments of the present disclosure, the scheduling probability provided by the embodiments of the present disclosure is a probability that the current frame is scheduled as a key frame.

In an optional example, step 204 may be executed by a processor by invoking a corresponding instruction stored in a memory, or may be executed by a scheduling unit run by the processor.

At 206, whether the current frame is scheduled as a key frame is determined according to the scheduling probability of the current frame.

If it is determined that the current frame is scheduled as a key frame, the current frame is determined as a current key frame, and operation 208 is executed; otherwise, if it is determined that the current frame is scheduled as a non-key frame, the subsequent process of this embodiment is not executed.

In the process of implementing the present disclosure, the applicant has found through research that the lager the difference between the low-level features between two frames (defined as a difference value between the low-level features of two frames) is, the lager a difference value of the corresponding semantic labels (defined as the proportion of non-coincident parts in the semantic labels of two frames) is, and according to the embodiments of the present disclosure, whether the current frame is scheduled as a key frame is confirmed by means of the difference between the low-level feature of the previous key frame adjacent to the current frame and the low-level feature of the current frame. When the difference between the low-level features between two frames is greater than a preset threshold, the current frame may be set as a key frame (i.e., scheduled as a key frame), so as to obtain an accurate semantic result.

In an optional example, step 206 may be executed by a processor by invoking a corresponding instruction stored in a memory, or may be executed by a determining unit run by the processor.

At 208, feature extraction is performed on a low-level feature of the current key frame via a second network layer of the neural network to obtain a high-level feature of the current key frame, and the low-level feature of the current key frame is buffered.

In an optional example, step 208 may be executed by a processor by invoking a corresponding instruction stored in a memory, or may be executed by a second feature extracting unit and a buffering unit run by the processor.

At 210, semantic segmentation is performed on the current key frame to output a semantic label of the current key frame.

In one optional example, step 210 may be executed by a processor by invoking a corresponding instruction stored in a memory, or may be executed by a semantic segmenting unit run by the processor.

In the process of implementing the present disclosure, the applicant has found through research that if the low-level features between frames in a video change greatly, the jitter between the semantic labels obtained by semantic segmentation performed thereon is large; otherwise, the jitter is small. In the embodiments of the present disclosure, feature information of at least one frame in the video may be obtained by using a deep learning method; the change of the low-level features is determined according to the difference between the low-level feature of the previous key frame adjacent to the current frame and the low-level feature of the current frame; the jitter between the frames in the video is analyzed; the degree of coincidence between the low-level features of the current frame and of the adjacent previous key frame is calculated; if the low-level features change greatly, the jitter of the labels is large; otherwise, the jitter is small, thereby implementing regression of the degree of jitter of the semantic labels by means of the low-level features, so as to adaptively schedule a key frame.

In one optional example of any one of the foregoing embodiments of the present disclosure, operation 104 or 204 may include:

splicing the low-level feature of the previous key frame and the low-level feature of the current frame to obtain a spliced feature; and obtaining, via a key frame scheduling network, a scheduling probability of the current frame on the basis of the spliced feature and outputting the scheduling probability.

The embodiments of the present disclosure may be used for an automatic driving scene, a video monitoring scene, and an Internet entertainment product such as portrait segmentation, for example, 1, in an automatic driving scene, a target (for example, a person and a vehicle) in a video may be quickly segmented by using the embodiments of the present disclosure;

2, in a video monitoring scene, a person may be quickly segmented;

3, in an Internet entertainment product such as portrait segmentation, a person may be quickly segmented from a video frame.

A person of ordinary skill in the art may understand that: all or some steps for implementing the foregoing method embodiments are achieved by a program by instructing related hardware; the foregoing program may be stored in a computer readable storage medium; and when the program is executed, the steps including the foregoing method embodiments are executed. Moreover, the foregoing storage medium includes various media capable of storing program codes, such as an ROM, an RAM, a magnetic disk, or an optical disk.

Figure 3:
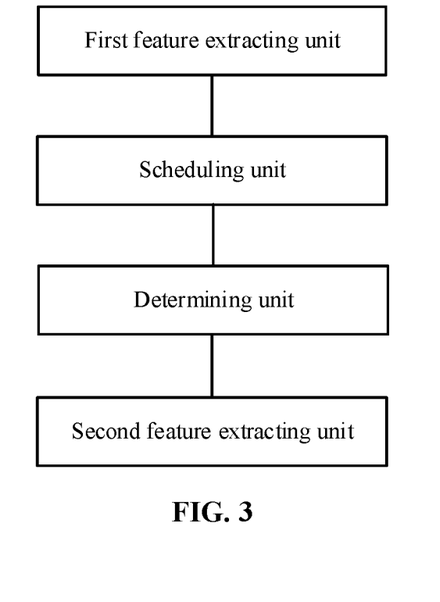
FIG. 3 is a schematic structural diagram of a key frame scheduling apparatus provided by the embodiments of the present disclosure.

FIG. 3 is a schematic structural diagram of a key frame scheduling apparatus provided by the embodiments of the present disclosure. The key frame scheduling apparatus of the foregoing embodiments of the present disclosure may be used for implementing the key frame scheduling method provided by the above embodiments of the present disclosure. As shown in FIG. 3, in one embodiment of the key frame scheduling apparatus, a first feature extracting unit, a scheduling unit, a determining unit, and a second feature extracting unit are included, where a first feature extracting unit, including a first network layer of a neural network, is configured to perform feature extraction on a current frame to obtain a low-level feature of the current frame;

a scheduling unit is configured to obtain a scheduling probability of the current frame according to a low-level feature of a previous key frame adjacent to the current frame and the low-level feature of the current frame, where the low-level feature of the previous key frame is obtained by performing feature extraction on the previous key frame via the first network layer, and the scheduling probability provided by the embodiments of the present disclosure is a probability that the current frame is scheduled as a key frame;

a determining unit is configured to determine whether the current frame is scheduled as a key frame according to the scheduling probability of the current frame; and a second feature extracting unit, including a second network layer of the neural network, is configured to, according to a determining result of the determining unit, if determining that the current frame is scheduled as a key frame, determine the current frame to be a current key frame, and perform feature extraction on a low-level feature of the current key frame to obtain a high-level feature of the current key frame, where the network depth of the first network layer in the neural network is less than the network depth of the second network layer in the neural network.

On the basis of the key frame scheduling apparatus provided by the foregoing embodiments of the present disclosure, feature extraction is performed on a current frame to obtain a low-level feature of the current frame; a scheduling probability of the current frame is obtained according to a low-level feature of an adjacent previous key frame and the low-level feature of the current frame; whether the current frame is scheduled as a key frame is determined according to the scheduling probability of the current frame; and if it is determined that the current frame is scheduled as a key frame, feature extraction is performed on a low-level feature of a current key frame to obtain a high-level feature of the current key frame. According to the embodiments of the present disclosure, a change of the low-level feature of the current frame with respect to the previous key frame can be obtained according to the low-level feature of the previous key frame and the low-level feature of the current frame, key frame scheduling can be performed rapidly, accurately, and adaptively by use of a change of low-level features between different frames in a video, and the scheduling efficiency of a key frame is improved.

In one optional implementation mode of the key frame scheduling apparatus provided by the embodiments of the present disclosure, the previous key frame includes a predetermined initial key frame.

Figure 4:
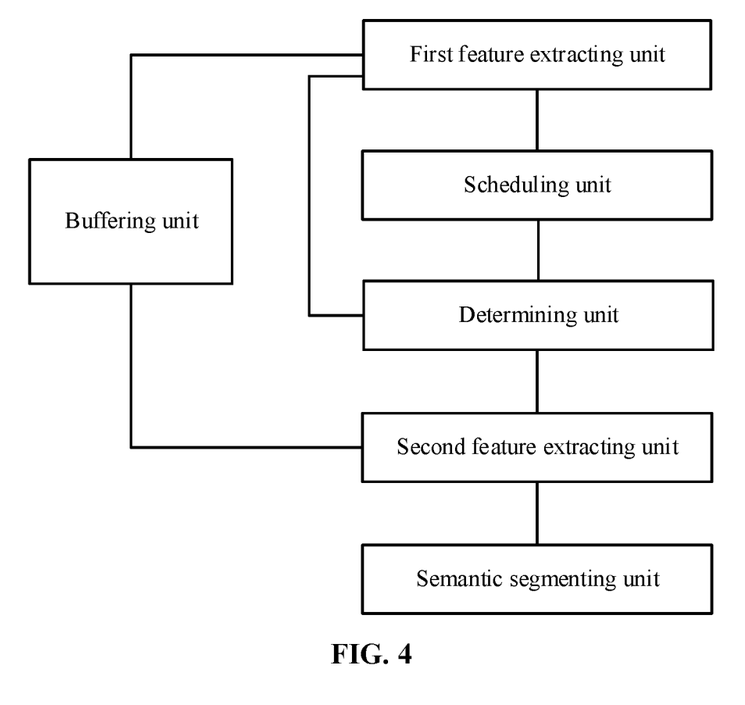
FIG. 4 is another schematic structural diagram of a key frame scheduling apparatus provided by the embodiments of the present disclosure.

FIG. 4 is another schematic structural diagram of a key frame scheduling apparatus provided by the embodiments of the present disclosure. As shown in FIG. 4, compared with the embodiment shown in FIG. 3, in this embodiment, the key frame scheduling apparatus further includes: a buffering unit, configured to buffer a low-level feature of a key frame, the key frame in the embodiments of the present disclosure comprising the initial key frame.

In addition, in still another embodiment of the key frame scheduling apparatus provided by the embodiments of the present disclosure, the first feature extracting unit is further configured to buffer the low-level feature of the current key frame in the buffering unit according to the determining result of the determining unit.

In one implementation mode of the key frame scheduling apparatus provided by the embodiments of the present disclosure, the scheduling unit may include: a splicing subunit, configured to splice the low-level feature of the previous key frame and the low-level feature of the current frame to obtain a spliced feature; and a key frame scheduling network, configured to obtain a scheduling probability of the current frame on the basis of the spliced feature.

In addition, with reference to FIG. 4 again, the key frame scheduling apparatus provided by the embodiments of the present disclosure may further include: a semantic segmenting unit, configured to perform semantic segmentation on the key frame to output a semantic label of the key frame, where the key frame in the embodiments of the present disclosure may include: the initial key frame, the previous key frame, or the current key frame.

In addition, the embodiments of the present disclosure further provide an electronic device, including the key frame scheduling apparatus according to any one of the foregoing embodiments of the present disclosure.

In addition, the embodiments of the present disclosure further provide another electronic device, including:

a processor and the key frame scheduling apparatus according to any one of the foregoing embodiments of the present disclosure, where when the processor runs the key frame scheduling apparatus, units in the key frame scheduling apparatus according to any one of the foregoing embodiments of the present disclosure are run.

In addition, the embodiments of the present disclosure further provide still another electronic device, including: a processor and a memory, where the memory is configured to store at least one executable instruction, and the executable instruction causes the processor to execute operations of steps in the key frame scheduling method according to any one of the foregoing embodiments of the present disclosure.

Figure 5:
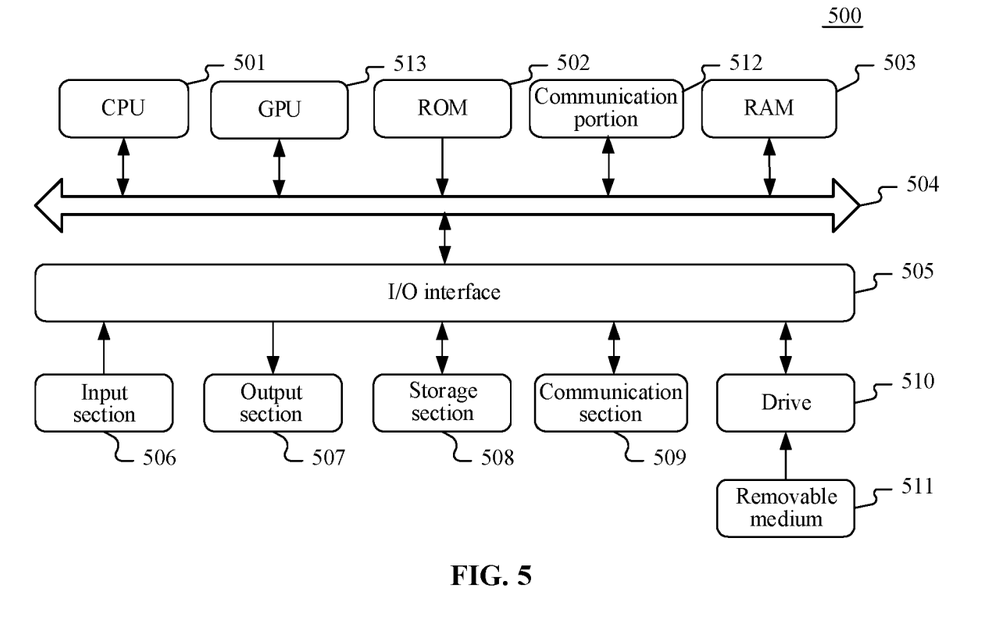
FIG. 5 is a schematic structural diagram of one application embodiment of an electronic device provided by the embodiments of the present disclosure.

The embodiments of the present disclosure further provide an electronic device which may be, for example, a mobile terminal, a Personal Computer (PC), a tablet computer, a server, or the like. FIG. 5 is a schematic structural diagram of one application embodiment of an electronic device provided by the embodiments of the present disclosure. Referring to FIG. 5 below, a schematic structural diagram of an electronic device 500, which may be a terminal device or a server, suitable for implementing the embodiments of the present disclosure is shown. As shown in FIG. 5, the electronic device 500 includes one or more processors, a communication portion, and the like. The one or more processors are, for example, one or more Central Processing Units (CPUs) 501 and/or one or more Graphic Processing Units (GPUs) 513, etc., and the processors may execute appropriate actions and processing according to executable instructions stored in a Read-Only Memory (ROM) 502 or executable instructions loaded from a storage section 508 to a Random Access Memory (RAM) 503. The communication portion 512 may include, but is not limited to, a network card. The network card may include, but is not limited to, an Infiniband (IB) network card.

The processor may communicate with the ROM 502 and/or the RAM 503 to execute executable instructions, is connected to the communication portion 512 by means of a bus 504, and communicates with other target devices by means of the communication portion 512, so as to complete corresponding operations of any one of the methods provided by the embodiments of the present disclosure, for example, performing feature extraction on a current frame via a first network layer of a neural network to obtain a low-level feature of the current frame; obtaining a scheduling probability of the current frame according to a low-level feature of a previous key frame adjacent to the current frame and the low-level feature of the current frame, where the low-level feature of the previous key frame is obtained by performing feature extraction on the previous key frame via the first network layer; determining whether the current frame is scheduled as a key frame according to the scheduling probability of the current frame; and if determining that the current frame is scheduled as a key frame, determining the current frame to be a current key frame, performing feature extraction on a low-level feature of a current key frame via a second network layer of the neural network to obtain a high-level feature of the current key frame, where the network depth of the first network layer in the neural network is less than the network depth of the second network layer in the neural network.

In addition, the RAM 503 may further store various programs and data required for operations of the apparatus. The CPU 501, the ROM 502, and the RAM 503 are connected to each other by means of the bus 504. In the presence of the RAM 503, the ROM 502 is an optional module. The RAM 503 stores executable instructions, or writes the executable instructions into the ROM 502 during running, where the executable instructions cause the CPU 501 to execute corresponding operations of the foregoing communication method. An Input/Output (I/O) interface 505 is also connected to the bus 504. The communication portion 512 may be integrated, or may be configured to have a plurality of sub-modules (for example, a plurality of IB network cards) connected to the bus.

The following components are connected to the I/O interface 505: an input section 506 including a keyboard, a mouse, and the like; an output section 507 including a Cathode-Ray Tube (CRT), a Liquid Crystal Display (LCD), a speaker, and the like; a storage section 508 including a hard disk and the like; and a communication section 509 including a network interface card such as an LAN card and a modem. The communication section 509 executes communication processing via a network such as the Internet. A drive 510 is also connected to the I/O interface 505 according to requirements. A removable medium 511 such as a magnetic disk, an optical disk, a magneto-optical disk, and a semiconductor memory, is mounted on the drive 510 according to requirements, so that a computer program read from the removable medium is installed on the storage section 508 according to requirements.

It should be noted that the architecture shown in FIG. 5 is merely an optional implementation mode. During specific practice, the number and type of the components in FIG. 5 are selected, decreased, increased, or replaced according to actual requirements. Different functional components may be separated or integrated or the like. For example, the GPU 513 and the CPU 501 may be separated, or the GPU 513 may be integrated on the CPU 501, and the communication portion may be separated from or integrated on the CPU 501 or the GPU 513 or the like. These alternative implementation modes all fall within the scope of protection of the present disclosure.

Particularly, the process described above with reference to the flowchart according to the embodiments of the present disclosure may be implemented as a computer software program. For example, the embodiments of the present disclosure provide a computer program product, which includes a computer program tangibly included in a machine-readable medium. The computer program includes a program code for executing a method shown in the flowchart. The program code may include corresponding instructions for correspondingly executing steps of the method provided by the embodiments of the present disclosure, for example, performing feature extraction on a current frame via a first network layer of a neural network to obtain a low-level feature of the current frame; obtaining a scheduling probability of the current frame according to a low-level feature of a previous key frame adjacent to the current frame and the low-level feature of the current frame, where the low-level feature of the previous key frame is obtained by performing feature extraction on the previous key frame via the first network layer; determining whether the current frame is scheduled as a key frame according to the scheduling probability of the current frame; and if determining that the current frame is scheduled as a key frame, determining the current frame to be a current key frame, performing feature extraction on a low-level feature of a current key frame via a second network layer of the neural network to obtain a high-level feature of the current key frame, where the network depth of the first network layer in the neural network is less than the network depth of the second network layer in the neural network. In such embodiments, the computer program may be downloaded and installed from the network by means of the communication portion 509, and/or is installed from the removable medium 511. The computer program, when being executed by the CPU 501, executes the foregoing functions defined in the method of the present disclosure.

In addition, the embodiments of the present disclosure further provide a computer storage medium configured to store computer readable instructions, where when the instructions are executed, operations of the key frame scheduling method according to any one of the foregoing embodiments of the present disclosure are implemented.

In addition, the embodiments of the present disclosure further provide a computer program, including computer readable instructions, where when the computer readable instructions run in a device, a processor in the device executes executable instructions for implementing steps of the key frame scheduling method according to any one of the foregoing embodiments of the present disclosure.

In one optional implementation mode, the computer program is specifically a software product, such as a Software Development Kit (SDK).

In one or more optional implementation modes, the embodiments of the present disclosure further provide a computer program product configured to store computer readable instructions, where when the instructions are executed, a computer executes the key frame scheduling method according to any one of the foregoing possible implementation modes.

The computer program product may be specifically implemented by means of hardware, software, or a combination thereof. In one optional example, the computer program product is specifically embodied in a computer storage medium. In another optional example, the computer program product is specifically embodied in a software product, such as an SDK.

Various embodiments in this description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The method and apparatus in the present disclosure may be implemented in many manners. For example, the method and apparatus in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure may also be implemented as programs recorded in a recording medium. The programs include machine-readable instructions for implementing the method according to the present disclosure. Therefore, the present disclosure further covers the recording medium storing the programs for performing the method according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A key frame scheduling method, comprising:
performing feature extraction on a current frame via a first network layer of a neural network to obtain a low-level feature of the current frame;
obtaining a scheduling probability of the current frame according to a low-level feature of a previous key frame adjacent to the current frame and the low-level feature of the current frame, wherein the low-level feature of the previous key frame is obtained by performing feature extraction on the previous key frame via the first network layer, and the scheduling probability is a probability that the current frame is scheduled as a key frame;
determining whether the current frame is scheduled as a key frame according to the scheduling probability of the current frame; and
responsive to determining that the current frame is scheduled as a key frame, using the current frame as a current key frame and buffering a low-level feature of the current key frame, and performing feature extraction on the low-level feature of the current key frame via a second network layer of the neural network to obtain a high-level feature of the current key frame, wherein a network depth of the first network layer is less than a network depth of the second network layer.

2. The method according to claim 1, further comprising:
determining an initial key frame;
performing feature extraction on the initial key frame via the first network layer to obtain a low-level feature of the initial key frame and buffer the low-level feature of the initial key frame; and
performing feature extraction on the low-level feature of the initial key frame via the second network layer to obtain a high-level feature of the initial key frame.

3. The method according to claim 2, further comprising:
performing semantic segmentation on the initial key frame to output a semantic label of the initial key frame.

4. The method according to claim 1, wherein the obtaining a scheduling probability of the current frame according to a low-level feature of a previous key frame adjacent to the current frame and the low-level feature of the current frame comprises:
splicing the low-level feature of the previous key frame and the low-level feature of the current frame to obtain a spliced feature; and
obtaining, via a key frame scheduling network, a scheduling probability of the current frame based on the spliced feature.

5. The method according to claim 1, further comprising:
performing semantic segmentation on the current key frame to output a semantic label of the current key frame.

6. A key frame scheduling apparatus, comprising:
a processor; and
a memory for storing instructions executed by the processor,
wherein the processor is configured to:
perform feature extraction on a current frame via a first network layer of a neural network to obtain a low-level feature of the current frame;
obtain a scheduling probability of the current frame according to a low-level feature of a previous key frame adjacent to the current frame and the low-level feature of the current frame, wherein the low-level feature of the previous key frame is obtained by performing feature extraction on the previous key frame via the first network layer, and the scheduling probability is a probability that the current frame is scheduled as a key frame;
determine whether the current frame is scheduled as a key frame according to the scheduling probability of the current frame; and
responsive to determining that the current frame is scheduled as a key frame, use the current frame as a current key frame and buffer a low-level feature of the current key frame, and perform feature extraction on the low-level feature of the current key frame to obtain a high-level feature of the current key frame, wherein a network depth of the first network layer is less than a network depth of the second network layer.

7. The apparatus according to claim 6, wherein the previous key frame comprises a predetermined initial key frame; and
the processor is further configured to buffer a low-level feature of the initial key frame.

8. The apparatus according to claim 6, wherein the processor is configured to:
splice the low-level feature of the previous key frame and the low-level feature of the current frame to obtain a spliced feature; and
obtain a scheduling probability of the current frame based on the spliced feature.

9. The apparatus according to claim 6, wherein the processor is configured to:
perform semantic segmentation on the key frame to output a semantic label of the key frame, the key frame comprising at least one of: the initial key frame, the previous key frame, or the current key frame.

10. An electronic device, comprising the key frame scheduling apparatus according to claim 6.

11. A non-transitory computer readable medium, having stored thereon computer readable instructions that, when being executed, implement a key frame scheduling method comprising:
performing feature extraction on a current frame via a first network layer of a neural network to obtain a low-level feature of the current frame;
obtaining a scheduling probability of the current frame according to a low-level feature of a previous key frame adjacent to the current frame and the low-level feature of the current frame, wherein the low-level feature of the previous key frame is obtained by performing feature extraction on the previous key frame via the first network layer, and the scheduling probability is a probability that the current frame is scheduled as a key frame;
determining whether the current frame is scheduled as a key frame according to the scheduling probability of the current frame; and
responsive to determining that the current frame is scheduled as a key frame, using the current frame as a current key frame and buffering a low-level feature of the current key frame, and performing feature extraction on the low-level feature of the current key frame via a second network layer of the neural network to obtain a high-level feature of the current key frame, wherein a network depth of the first network layer is less than a network depth of the second network layer.

12. The non-transitory computer readable medium according to claim 11, wherein the method further comprises:

determining an initial key frame;

performing feature extraction on the initial key frame via the first network layer to obtain a low-level feature of the initial key frame and buffer the low-level feature of the initial key frame; and performing feature extraction on the low-level feature of the initial key frame via the second network layer to obtain a high-level feature of the initial key frame.

13. The non-transitory computer readable medium according to claim 12, wherein the method further comprises:

performing semantic segmentation on the initial key frame to output a semantic label of the initial key frame.

14. The non-transitory computer readable medium according to claim 11, wherein the obtaining a scheduling probability of the current frame according to a low-level feature of a previous key frame adjacent to the current frame and the low-level feature of the current frame comprises:

splicing the low-level feature of the previous key frame and the low-level feature of the current frame to obtain a spliced feature; and obtaining, via a key frame scheduling network, a scheduling probability of the current frame based on the spliced feature.

15. The non-transitory computer readable medium according to claim 11, wherein the method further comprises:

performing semantic segmentation on the current key frame to output a semantic label of the current key frame.

16. The method according to claim 1, wherein obtaining a scheduling probability of the current frame according to a low-level feature of a previous key frame adjacent to the current frame and the low-level feature of the current frame, comprises:

determining a difference value between the low-level feature of the previous key frame and the low-level feature of the current frame; and obtaining a scheduling probability of the current frame according to the determined difference value between the low-level feature of the previous key frame and the low-level feature of the current frame, the method further comprising:

when the difference value between the low-level feature of the previous key frame and the low-level feature of the current frame is greater than a preset threshold, determining that the current frame is scheduled as the current key frame.

* * * * *